Patented Dec. 5, 1939

2,182,351

UNITED STATES PATENT OFFICE 2,182,351

SULPHUR DYESTUFFS

Ellis L. Punnett, Buffalo, N. Y., assignor to National Aniline & Chemical Company, Inc., New York, N. Y., a corporation of New York No Drawing. Application November 19, 1937, Serial No. 175,437

14 Claims. (Cl. 260—128)

The present invention relates to new sulphur dyestuffs and to a process for making them.

In the application of Robert L. Perkins, Serial No. 175,438, filed of even date herewith, there is described a new class of sulphur dyestuffs which may be manufactured by reacting a 1,8-aminonaphthol disulphonate with an alkali metal polysulphide in the presence of an aldehyde. The dyestuffs prepared in accordance with the process of that application possess the advantages over many of the sulphur dyestuffs available at the present time in that they have the combined properties of producing satisfactory shades of brown when dyed on textile materials from the usual alkaline sulphide bath, of being free from copper, and of being capable of being used in standing baths. Most of the brown sulphur dyes which are available at the present time are deficient in one or more particulars. For example, many of the sulphur dyes which produce satisfactory shades of brown when dyed on textile materials contain copper. As is well known, the presence of copper is undesirable in sulphur dyes which are to be employed for the coloring of textile materials, for example, unmordanted cotton, intended for use in the preparation of rubberized fabrics; the copper having a deleterious effect on the rubber coating. On the other hand, many of the copper-free sulphur browns now available are unsatisfactory in their dyeing quality, being of low tinctorial value and producing shades when dyed on unmordanted cotton which are dull and weak. A further property which is lacking in many sulphur dyes but which is possessed by the dyes prepared by the procedure of the above application is the ability to be employed in a standing bath.

In accordance with the present invention, it has been discovered that sulphur dyestuffs possessing the above described properties may be prepared by a process similar to that of the above application by reacting a 1,8-aminonaphthol disulphonate with an alkali metal polysulphide in the presence of a heterocyclic aldehyde containing a furan radical, such as, for example, furfural, methyl furfural, hydroxy furfural, aldehyde-furan carboxylic acid, etc.

The new sulphur dyestuffs may be made in accordance with a preferred method of procedure by first preparing a mixture containing a neutral salt, e. g., a neutral sodium salt, of a 1,8-aminonaphthol disulphonic acid, at least four molar equivalents of an alkali metal polysulphide, e. g., sodium tetrasulphide, in the presence of at least one molar equivalent of a heterocyclic aldehyde containing a furan radical, preferably furfural. The mixture is heated at an elevated temperature for a sufficient period of time to fuse the materials and to cause the reaction to take place resulting in the formation of a dry solid mass consisting of the sulphur dye.

The sulphur dyestuffs of the present invention prepared in accordance with the foregoing procedure are solids which when ground are converted to black to red-brown powders. The dyestuffs in powder form are soluble in water, dilute alkali and aqueous alkali sulphide solutions. They are, however, insoluble in alcohol. When employed in the usual alkaline sulphide baths, they dye unmordanted cotton yellow-brown to red-brown shades of good fastness properties to light and to washing. The new dyestuffs also possess the property of being capable of being employed in standing baths. Further, since they are free from copper, they may be employed with advantage for the dyeing of textile materials intended for use in the production of rubberized fabrics.

The 1,8-aminonaphthol disulphonates employed in the preparation of the new sulphur dyestuffs are used in substantially neutral condition, and, in view of the fact that aminonaphthol disulphonic acids as commercially produced are usually in the form of partially neutralized salts, it is preferable to neutralize them before they are reacted with the aldehyde and the polysulphide in the reaction mixture. This may be done conveniently by adding the necessary alkali to an aqueous suspension of the 1,8-aminonaphthol disulphonic acid to be used. Caustic soda is used preferably for this purpose in view of its low cost and satisfactory action, but caustic potash or alkali carbonates may be used with equivalent results. The aqueous solution of the resulting alkali metal salt of the 1,8-aminonaphthol disulphonic acids should be substantially neutral, but a slight excess of alkali is not objectionable.

Any of the known 1,8-aminonaphthol disulphonic acids may be employed in the preparation of the dyestuffs of the present invention, such as, for example, 1,8-aminonaphthol-3,6-disulphonic acid, 1,8-aminonaphthol-2,4-disulphonic acid, 1,8-aminonaphthol-4,6-disulphonic acid, and 1,8-aminonaphthol-3,5-disulphonic acid. It has been found in accordance with the present invention that dyestuffs prepared from salts of 1,8-aminonaphthol-3,6-disulphonic acid are of particular value, and, accordingly, such dyestuffs represent a preferred embodiment of the present invention.

In the preparation of the dyestuffs of the present invention, the alkali metal polysulphides employed should contain at least two atoms of sulphur for each atom of alkali metal therein. While an excess of sulphur combined in the polysulphides does not have a noticeable deleterious effect on the resulting dyestuffs, it has been found that alkali metal polysulphides corresponding with the formula $Me_2S_x$, wherein $x$ is between 4 and 5, inclusive, when used in the process of the present invention are productive of sulphur dyestuffs having high tinctorial power and producing rich shades of brown when dyed on textile materials. In accordance with preferred practice, a sodium polysulphide is used in the manufacture of the new dyestuffs but polysulphides of other alkali metals may be used if desired. The polysulphides may be prepared in any convenient or desired manner, many of which are well known in the art, for example, they may be prepared in aqueous solutions from the common alkali metal sulphide, such as $Na_2S$, and the necessary amount of sulphur or from the alkali metal hydroxide and sulphur.

In order that the invention may be more fully understood, reference should be had to the following specific example which illustrates a method for the preparation of a preferred product. It will be understood, however, the invention is not limited to this example. The parts are by weight and the temperatures in degrees centigrade.

*Example.*—15 parts of furfuraldehyde are added to a faintly alkaline solution of 26.75 parts of the sodium salt of H-acid (1,8-aminonaphthol-3,6-monosodium sulphonate) in about 40 parts of water. The mixture is heated to a temperature of about 75° while agitated, and is maintained at that temperature for about 10 minutes. The mixture is then added to an aqueous polysulphide solution containing 28.7 parts of ground sulphur, 39 parts of commercial fused sodium sulphide (approximately 60% $Na_2S$) and about 50 parts of water. The resulting mixture is then raised to a temperature of about 250° over a period of 6 hours and is maintained at this temperature for about 13 hours. The mixture, as a result of this treatment, is converted to a solid fused mass consisting of the desired sulphur dyestuff, and when cooled and ground is a dark brown to black powder which is somewhat soluble in water and completely soluble in an aqueous sodium sulphide solution. The aqueous sodium sulphide solution of the dyestuff dyes unmordanted cotton a dark brown shade.

It will be understood, of course, that while the above example is representative of preferred practice in accordance with the present invention, the procedure followed may be extensively varied without departing from the scope of the invention. For example in place of the disodium salt of 1,8-aminonaphthol-3,6-disulphonic acid of the example, other alkali metal salts of this compound may be employed with substantially equivalent results. Further, the sodium or other alkali metal salt of 1,8-aminonaphthol-3,6-disulphonic acid may be replaced with equivalent amounts of the alkali metal salts of other 1,8-aminonaphthol disulphonic acids, for example, those mentioned above. By employing these latter materials in place of the aminonaphthol disulphonic acid salt of the example, dyestuffs of slightly different character may be produced, but they possess the important advantages pointed out above.

Further, dyestuffs of similar properties may be prepared in an analogous manner by employing in place of the furfuraldehyde of the example, an equivalent amount of another heterocyclic aldehyde containing a furan radical.

In carrying out the preparation of the dyestuffs, the order in which the various materials are combined may be varied. For example, while it is preferred to combine the materials in the form of their solutions or slurries and then evaporate the resulting mixture to dryness, a dyestuff may be prepared by mixing the materials without addition of water thereto and then fusing the mixture. The neutralized slurry of the 1,8-aminonaphthol disulphonate is a convenient mass to which the charge of heterocyclic aldehyde may be added, but it is to be understood, of course, that the heterocyclic aldehyde could be added with substantially equivalent results to the aqueous polysulphide solution before or after the latter is mixed with the 1,8-aminonaphthol disulphonate.

In the preparation of the new dyestuffs, the proportions of ingredients and temperatures may be varied within the scope of the present invention. It has been found, however, that to prepare sulphur dyestuffs of superior properties with respect to the shade obtained on textile materials, the amount of heterocyclic aldehyde used should be from one to two molar equivalents of the aldehyde for each molar equivalent of the 1,8-aminonaphthol disulphonate employed. Although the use of more than this quantity of heterocyclic aldehyde appears to have no adverse effect on the resulting dyestuff, it causes no appreciable improvement in the yield, shade, or dyeing quality of the resulting dyestuff, and, hence, the use of an excess should be avoided. On the other hand, if materially less than the preferred amount of heterocyclic aldehyde is introduced into the reaction mixture, the resulting dyestuffs have been found to be of low tinctorial value, dyeing cotton dull, weak, yellow-brown shades, and, hence, the dyestuffs are materially inferior to the dyestuffs which are made with the preferred quantity of aldehyde set out above.

In accordance with preferred procedure, the alkali metal polysulphide is employed in the reaction mixtures in the proportion of four molar equivalents of alkali metal polysulphide for each molar equivalent of the 1,8-aminonaphthol disulphonate. It has been found that the use of these proportions results in a superior yield and quality of the sulphur dyestuffs. If less polysulphide is employed, the resulting dyestuffs have inferior tinctorial value and lack the superior tones of the dyestuffs which are made with the preferred ratio of polysulphide. The use of a larger proportion of polysulphide should be avoided since this causes no commensurate improvement in the yield or quality of the dyestuff.

While it will be understood that the temperature at which the mixture of 1,8-aminonaphthol disulphonate, aldehyde, and alkali metal polysulphide is heated cannot be exactly fixed, it has been found that the dyestuffs prepared by heating the mixture in a suitable apparatus for at least thirteen hours at a temperature between about 210° C. and about 330° C. have high tinctorial strength and dye unmordanted cotton from a sulphide bath superior brown shades. If the dried mass is heated to below 210° C., the resulting dyestuff is tinctorially weak, giving dyeings of a dull shade of poor fastness, and if the dried mass is heated above 330° C., the dyestuffs tend to decompose and lose their tinctorial value and brightness.

It will thus be seen that the present invention provides new sulphur dyestuffs which may be efficiently prepared in a relatively simple manner. The dyestuffs may be employed in standing baths, and are characterized by the yellowish-brown to red-brown shades they produce on unmordanted cotton. Further, because they are free of copper, they are available for use in dyeing textile materials intended for use in the production of rubberized fabrics.

Since certain changes may be made in the above processes and products without departing from the scope of the invention, it will be understood that the foregoing description should be interpreted as illustrative and not in a limiting sense.

I claim:

1. Sulphur dyestuffs dying unmordanted cotton brown shades and being reaction products of a 1,8-aminonaphthol disulphonate, an alkali metal polysulphide containing at least two atoms of sulphur for each atom of alkali metal therein, and a furan aldehyde.

2. Sulphur dyestuffs dyeing unmordanted cotton brown shades and being reaction products of a 1,8-aminonaphthol disulphonate, an alkali-metal polysulphide containing at least two atoms of sulphur for each atom of alkali-metal therein, and furfural.

3. Sulphur dyestuffs dying unmordanted cotton brown shades and being reaction products of a substantially neutral alkali-metal salt of a 1,8-aminonaphthol disulphonic acid, at least four molar equivalents of an alkali-metal polysulphide containing at least two atoms of sulphur for each atom of alkali-metal therein, and at least one molar equivalent of a furan aldehyde.

4. Sulphur dyestuffs dying unmordanted cotton brown shades and being reaction products of a substantially neutral alkali-metal salt of a 1,8-aminonaphthol disulphonic acid, at least four molar equivalents of an alkali-metal polysulphide containing at least two atoms of sulphur for each atom of alkali-metal therein, and at least one molar equivalent of furfural.

5. Sulphur dyestuffs dyeing unmordanted cotton brown shades obtainable by a process comprising evaporating to dryness an aqueous mixture containing a substantially neutral alkali-metal salt of a 1,8-aminonaphthol disulphonic acid, at least four molar equivalents of an alkali-metal polysulphide containing at least two atoms of sulphur for each atom of alkali-metal therein, and at least one molar equivalent of a furan aldehyde, and heating the resulting dry mass at an elevated temperature for a sufficient period of time to fuse the materials and to cause a reaction to take place resulting in the formation of a sulphur dyestuff.

6. Sulphur dyestuffs dyeing unmordanted cotton brown shades obtainable by a process comprising evaporating to dryness an aqueous mixture containing a substantially neutral alkali-metal salt of 1,8-aminonaphthol-3,6-disulphonic acid, at least four molar equivalents of an alkali-metal polysulphide of the general formula $Me_2S_x$, where Me represents an alkali-metal and $x$ is from 4 to 5 and at least one molar equivalent of a furan aldehyde, and heating the resulting dry mass at a temperature between about 210° C. and about 330° C. for at least 13 hours to fuse the materials and to cause a reaction to take place resulting in the formation of a sulphur dyestuff.

7. A sulphur dyestuff dyeing unmordanted cotton a rich brown shade which is fast to washing, said dyestuff being in ground form a dark brown powder which is soluble in water and in aqueous alkali sulphide solution, said dyestuff being obtainable by a process comprising evaporating to dryness an aqueous mixture containing a substantially neutral sodium salt of 1,8-aminonaphthol-3,6-disulphonic acid, about four molar equivalents of sodium tetrasulphide, and from one to two molar equivalents of furfural, and heating the resulting dry mass at a temperature of about 250° C. for about 13 hours to fuse the materials and cause a reaction to take place resulting in the formation of a sulphur dyestuff.

8. The process for the preparation of sulphur dyestuffs dyeing unmordanted cotton brown shades which comprises reacting a 1,8-aminonaphthol disulphonate with an alkali-metal polysulphide containing at least 2 atoms of sulphur for each atom of alkali metal therein in the presence of a furan aldehyde.

9. The process for the preparation of sulphur dyestuffs dyeing unmordanted cotton brown shades which comprises reacting a 1,8-aminonaphthol disulphonate with a sodium polysulphide containng at least 2 atoms of sulphur for each atom of sodium therein in the presence of furfural.

10. The process for the preparation of sulphur dyestuffs dyeing unmordanted cotton brown shades which comprises reacting a substantially neutral alkali-metal salt of a 1,8-aminonaphthol disulphonic acid with at least four molar equivalents of an alkali-metal polysulphide containing at least two atoms of sulphur for each atom of alkali-metal therein in the presence of at least one molar equivalent of a furan aldehyde.

11. The process for the preparation of sulphur dyestuffs dyeing unmordanted cotton brown shades which comprises heating a mixture comprising a substantially neutral alkali-metal salt of a 1,8-aminonaphthol disulphonic acid, at least four molar equivalents of an alkali-metal polysulphide containing at least 2 atoms of sulphur for each atom of alkali-metal therein, and at least one molar equivalent of furfural for a period of time sufficient to fuse the materials and cause a reaction to take place resulting in the formation of a sulphur dyestuff.

12. The process for the preparation of sulphur dyestuffs dyeing unmordanted cotton brown shades which comprises evaporating to dryness an aqueous mixture containing a substantially neutral alkali-metal salt of a 1,8-aminonaphthol disulphonic acid, at least four molar equivalents of an alkali-metal polysulphide containing at least two atoms of sulphur for each atom of alkali-metal therein, and at least one molar equivalent of a furan aldehyde, and heating the resulting dry mass at a temperature between about 210° C. and about 330° C. for a sufficient period of time to fuse the materials and to cause a reaction to take place resulting in the formation of a sulphur dyestuff.

13. The process for the preparation of sulphur dyestuffs dyeing unmordanted cotton brown shades which comprises evaporating to dryness an aqueous mixture containing a substantially neutral sodium salt of 1,8-aminonaphthol-3,6-disulphonic acid, at least four molar equivalents of an alkali-metal polysulphide containing at least two atoms of sulphur for each atom of alkali-metal therein, and at least one molar equivalent of a furan aldehyde, and heating the resulting dry mass at a temperature between about 210° C. and about 330° C. for at least 13 hours to fuse the materials and to cause a reaction to take place resulting in the formation of a sulphur dyestuff.

14. The process for the preparation of sulphur dyestuffs dyeing unmordanted cotton brown shades which comprises evaporating to dryness an aqueous mixture containing a substantially neutral sodium salt of 1,8-aminonaphthol-3,6-disulphonic acid, at least four molar equivalents of an alkali-metal polysulphide containing at least two atoms of sulphur for each atom of alkali-metal therein and at least one molar equivalent of furfural, and heating the resulting dry mass at a temperature between about 210° C. and about 330° C. for at least 13 hours to fuse the materials and to cause a reaction to take place resulting in the formation of a sulphur dyestuff.

ELLIS L. PUNNETT.